United States Patent
Barois et al.

(10) Patent No.: US 12,470,972 B2
(45) Date of Patent: Nov. 11, 2025

(54) TRANSMISSION METHOD AND NODE DEVICE IMPLEMENTING SAID METHOD WITH LIMITED MAXIMUM USE TIME ON A SLIDING TIME WINDOW

(71) Applicant: SAGEMCOM ENERGY & TELECOM SAS, Rueil Malmaison (FR)

(72) Inventors: Jérôme Barois, Rueil Malmaison (FR); Guillaume Juan, Rueil Malmaison (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 371 days.

(21) Appl. No.: 17/885,270

(22) Filed: Aug. 10, 2022

(65) Prior Publication Data

US 2023/0064073 A1 Mar. 2, 2023

(30) Foreign Application Priority Data

Aug. 26, 2021 (FR) ...................................... 2108916

(51) Int. Cl.
*H04W 28/02* (2009.01)
*H04B 3/54* (2006.01)
(Continued)

(52) U.S. Cl.
CPC .......... *H04W 28/0231* (2013.01); *H04B 3/54* (2013.01); *H04L 1/1607* (2013.01); *H04W 28/06* (2013.01)

(58) Field of Classification Search
CPC . H04W 28/0231; H04W 28/06; H04W 40/02; H04B 3/54; H04B 3/58;
(Continued)

(56) References Cited

U.S. PATENT DOCUMENTS

2001/0036185 A1* 11/2001 Dempo ................. H04L 9/40
370/466
2011/0051721 A1* 3/2011 Brothwell ................. H04B 3/54
370/353
(Continued)

OTHER PUBLICATIONS

Gabriel Montenegro et al., Transmission of IPV6 Packets over IEEE 802.15.4 Networks, Internet Engineering Task Force , RFC 4944, pp. 4-5 (Year: 2007).*

(Continued)

*Primary Examiner* — Ayman A Abaza
*Assistant Examiner* — Abdul Aziz Santarisi
(74) *Attorney, Agent, or Firm* — Williams Mullen; R. Brian Drozd

(57) ABSTRACT

A transmission method for transmitting a packet from a first node device to a second node device of an electrical supply network, the transmission method includes the following steps performed by the first node device: transmitting the IP packet by radio frequency in the case where a level of use by the first node device of the transmission by radio frequency calculated on a sliding time window with respect to a maximum use time is below a first threshold, the first threshold being below a second threshold beyond which any transmission by radio frequency is interrupted; transmitting the IP packet by powerline otherwise, and, in the case where the powerline transmission fails, transmitting the IP packet by radio frequency in the case where the level of use is below the second threshold.

9 Claims, 4 Drawing Sheets

(51) Int. Cl.
*H04L 1/1607* (2023.01)
*H04W 28/06* (2009.01)

(58) Field of Classification Search
CPC .... H04B 2203/5433; H04B 2203/5479; H04L 1/1607; Y02D 30/70
USPC ........................................................ 370/230
See application file for complete search history.

(56) References Cited

U.S. PATENT DOCUMENTS

| | | |
|---|---|---|
| 2011/0058614 A1 | 3/2011 | Au et al. |
| 2013/0188673 A1* | 7/2013 | Sun ..................... H04B 1/123 375/219 |
| 2014/0328355 A1 | 11/2014 | Sugimoto |
| 2015/0023369 A1 | 1/2015 | Hui et al. |
| 2016/0209896 A1* | 7/2016 | Yokomizo .............. G06Q 20/08 |

OTHER PUBLICATIONS

Narrowband orthogonal frequency division multiplexing power line communication transceivers for G3-PLC networks, May 2021, ITU-T, G.9903 Amendment 1, Appendix H (Year: 2021).*

Anil Mengi; "Narrowband OFDM PLC specifications for G3-PLC networks; C09RI;" International Telecommunications Union; 2021; vol. 18/15; Retrieved from the Internet: URL:https://www.itu.int/ifa/t/2017/sg15/do cs/rgm/Q18-210308/C/T17-SG15RGM-Q18-210308.

Apr. 22, 2022 Search Report issued in French Patent Application No. 2108916.

\* cited by examiner

TRANSMISSION METHOD AND NODE DEVICE IMPLEMENTING SAID METHOD WITH LIMITED MAXIMUM USE TIME ON A SLIDING TIME WINDOW

TECHNICAL FIELD

At least one embodiment relates to a transmission method for transmitting an IP packet from a first node device to a second node device belonging to a network neighbourhood of said first node device, said first and second node devices belonging to an electrical supply network and being configured for transmitting said IP packet by powerline and by radio frequency. At least one embodiment relates to a node device implementing said transmission method.

PRIOR ART

Powerline communications PLC are developing, in particular in the context of electrical supply networks of the AMM type (the acronym signifying "automated meter management"). Communication networks are thus implemented in electrical supply networks for the automated collection, by a base node device (also referred to as a "data concentrator") in the network, from smart electricity meters, of energy consumption reading data that said smart electricity meters are respectively responsible for monitoring.

The G3-PLC communication standard is defined to enable the various node devices (in particular data concentrator and smart electricity meters) in such a network to communicate with each other. The standard is specified in the ITU-T recommendation G.9903, which describes in particular the physical layer (PHY) and the data link layer (DLL) of the OSI model (the acronym for "Open Systems Interconnection"). The G3-PLC standard is intended to be used in frequency bands ranging from 10 to 490 kHz. It supports more particularly the following frequency bands: the CENELEC A frequency band, which ranges approximately from 35 kHz to 91 kHz; the FCC frequency band, which ranges approximately from 150 kHz to 480 kHz; the ARIB frequency band, which ranges approximately from 150 kHz to 400 kHz; and the CENELEC B frequency band, which ranges approximately from 98 kHz to 122 kHz. These various frequency bands have different characteristics in terms of bit rate, range and resistance to disturbances, in particular.

In a development of the G3-PLC standard defined in an Annex H of the ITU-T recommendation G.9903 (2017) Amendment 1 (05/2021), called G3-PLC Hybrid PLC & RF, an RF (the acronym for radio-frequency) radio channel can be used in place of one of said PLC frequency bands. More precisely, this version of the standard allows the occasional use of a secondary radio physical layer based on a SUN FSK modulation as defined in IEEE 802.15.4:2015. Thus, by using the various G3-PL and RF media for transmitting data, the electrical supply network maximises its coverage and its resilience. An electrical-supply network node capable of sending and receiving data using the two media (PLC and RF) is called a hybrid node.

However, in G3-PLC Hybrid PLC & RF, the choice of communicating between two hybrid nodes of the communication network either by powerline on a PLC frequency band or by radio frequency on an RF channel is determined at the time of construction or reconstruction of the communication routes. This choice of the communication medium used between two hybrid nodes of the network is generally fixed for several hours. Thus unicast messages are transmitted between said two hybrid nodes during this period either on a PLC frequency band or on an RF channel according to the choice made at the time of the construction or reconstruction of the route. The G3-PLC Hybrid PLC & RF standard defined in Amendment 1 (05/2021) therefore does not make it possible to use the full flexibility offered by PLC/RF hybridisation.

It is desirable to overcome these various drawbacks of the prior art. It is in particular desirable to propose a transmission method that makes it possible to select the communication medium between PLC and RF dynamically.

DISCLOSURE OF THE INVENTION

At least one embodiment relates to a transmission method for transmitting an IP packet from a first node device to a second node device belonging to a network neighbourhood of said first node device. The first and second node devices belong to an electrical supply network and are configured for transmitting said IP packet by powerline and by radio frequency. A use of the transmission by radio frequency is, at each node device, limited to a maximum time of use on a sliding time window. The transmission method comprises the following steps performed by said first node device in the case where said IP packet is not fragmented:

transmitting said IP packet by radio frequency in the case where a level of use by the first node device of the transmission by radio frequency calculated on the sliding time window with respect to said maximum use time is below a first threshold, said first threshold being below a second threshold beyond which any transmission by radio frequency is interrupted;
 transmitting said IP packet by powerline otherwise, and, in the case where said powerline transmission fails, transmitting the IP packet by radio frequency in the case where said level of use is below said second threshold.

The transmission method makes it possible to select the communication medium dynamically. This is because the choice of the communication medium is made with regard to each IP packet and more uniquely at the time that the route is constructed or reconstructed.

In a particular embodiment, the transmission method furthermore comprises the following steps performed by said first node device in the case where said IP packet is fragmented into a plurality of fragments comprising at least first and second fragments:

transmitting the fragments of said plurality of fragments by powerline in the case where said level of use is above a third threshold, said third threshold being above said first threshold and below said second threshold; and otherwise
 transmitting said first fragment using a transmission medium from powerline and radio frequency and transmitting said second fragment using the other one of said communication media;
 in the case where fragments are still to be transmitted, repeating the following steps:
  in the case where said level of use is below said third threshold and an acknowledgement has been received on a communication medium, transmitting a next fragment of said plurality of fragments using said communication medium on which said acknowledgement was received;
  transmitting said next fragment by powerline otherwise.

In one embodiment, the level of use is equal to tps/macDutyCycleLimit_RF*100, where macDutyCycleLimit_RF is said maximum use time on the sliding window and tps is the time of use by the node device of the transmission by radio frequency on the sliding time window.

In one embodiment, said IP packet is fragmented in accordance with the 6LowPAN protocol.

In one embodiment, in the case where the IP packet is transmitted by powerline, said IP packet is transmitted on at least one frequency band belonging to a set of frequency bands comprising:
the CENELEC A frequency band;
the CENELEC B frequency band; and
the FCC frequency band or the ARIB frequency band.

In one embodiment, in the case where the IP packet is transmitted by radio frequency, said IP packet is transmitted on a frequency band ranging from 863 MHz to 870 MHz.

At least one other embodiment relates to a node device belonging to an electrical supply network, said node device being configured for transmitting an IP packet by powerline and by radio frequency to another node of said electrical supply network belonging to its network neighbourhood. A use of the transmission by radio frequency is, at each node device, limited to a maximum time of use on a sliding time window. The transmission method comprises the following steps performed by said first node device in the case where said IP packet is not fragmented:
transmitting said IP packet by radio frequency in the case where a levelof use by the first node device of the radio frequency transmission calculated on the sliding time window with respect to said maximum use time is below a first threshold, said first threshold being below a second threshold beyond which any transmission by radio frequency is interrupted;
transmitting said IP packet by powerline otherwise, and, in the case where said powerline transmission fails, transmitting the IP packet by radio frequency in the case where said level of use is below said second threshold.

In a particular embodiment, said transmission means are furthermore configured for, in the case where said IP packet is fragmented into a plurality of fragments comprising at least first and second fragments:
transmitting the fragments of said plurality of fragments by powerline in the case where said level of use is above a third threshold, said third threshold being above said first threshold and below said second threshold; and otherwise
transmitting said first fragment using a communication medium from powerline and radio frequency and transmitting said second fragment using the other one of said communication media;
in the case where fragments are still to be transmitted, repeating the following steps:
in the case where said level of use is below said third threshold and an acknowledgement has been received on a communication medium, transmitting a next fragment of said plurality of fragments using said communication medium on which said acknowledgement was received;
transmitting said next fragment by powerline otherwise.

A computer program product is also described that comprises instructions for implementing the transmission method according to any one of the embodiments described previously, when said program is executed by a processor.

A storage medium is also described that stores a computer program comprising instructions for implementing the transmission method according to one of the embodiments described previously, when said program is executed by a processor.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
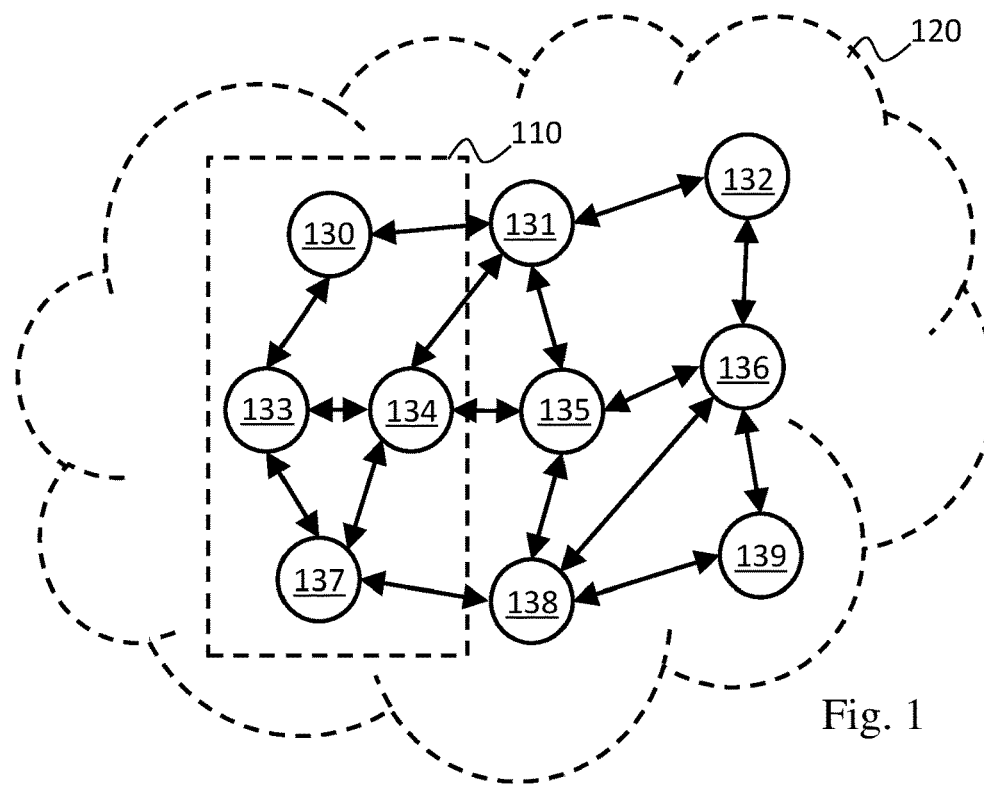
FIG. 1 illustrates schematically a mesh communication network.

FIG. 1 illustrates schematically a mesh communication network 120. The mesh communication network 120 is for example an electrical supply network of the AMM type. The mesh communication network 120 relies on powerline communications PLC or radio-frequency RF communications for enabling a base node device (also called a "data concentrator") to collect, from smart electricity meters, energy consumption reading data from electrical installations that said smart electricity meters are respectively responsible for monitoring. The data concentrator and the smart electricity meters are thus node devices of the mesh communication network 120. The mesh communication network 120 may comprise other node devices, for example installed at electrical transformers. The communication network 120 therefore has a mesh structure, as shown schematically on FIG. 1 by means of arrows, where node devices fulfil the role of relays for increasing the range of communications in the mesh communication network 120, as detailed below. Thus, one and the same smart electricity meter potentially has available several paths for reaching the data concentrator, and vice versa. In the remainder of the document, the terms "smart electricity meter" and "meter" are used interchangeably.

The present invention is thus particularly adapted to the context of G3-PLC Hybrid PLC & RF technology as defined in the ITU-T recommendation G.9903 (2017) Amendment 1 (05/2021) and more particularly in Annex H.

The mesh communication network 120 thus comprises a plurality of node devices 130, 131, 132, 133, 134, 135, 136, 137, 138, 139. A network neighbourhood is associated with each node device in the mesh communication network 120. On FIG. 1, the node device 133 is associated with a network neighbourhood 110 encompassing node devices 130, 134 and 137. This is because, in the mesh communication network 120, a signal or a message broadcast by a node device (such as the node device 133) is in general not visible at every point in said communication network. Each node device sending signals or messages then has a network neighbourhood, i.e. a subset of said mesh communication network 120 wherein any node device can intelligibly receive said signals or messages directly coming from the node device that broadcast said signals or messages. The network neighbourhood corresponds to the range of the signals sent, according to predetermined transmission parameters (e.g. power, modulation and coding scheme, network topology, etc.) of the node device at the source of said signals and also potentially according to characteristics of the communication channel (attenuation, noise, impedance, etc.).

The mesh communication network 120 relies on a routing protocol of the reactive type, such as the LOADng protocol ("Lightweight On-demand Ad hoc Distance-vector Routing Protocol—Next Generation"). Unlike the routing protocols of the proactive type, which rely on a global knowledge of network topology, the routing protocols of the reactive type rely on on-demand route discoveries, each node device in the network then needing solely to have knowledge of its own network neighbourhood to route data in the mesh communication network 120.

To discover a suitable route in the mesh communication network 120 from a source node device (for example the node device 133) to a destination node device (for example the node device 132), it is known for the source node device to broadcast a route discovery request, called RREQ ("Route REQuest"). This route discovery request is received by each node device in the network neighbourhood of said source node device. Each node device in the network neighbourhood of said source node device relays, by broadcasting, said request if said node device in question is not the destination node device. By gradual broadcasting, a plurality of route discovery requests are typically received by the destination node device, each of these requests having followed a different path in the mesh communication network 120.

Each node device that is at the origin of a message, such as for example a route discovery request, includes therein an identifier that is particular to it, as well as a sequence number, as defined in the LOADng protocol. This sequence number is a counter value particular to each node device of the mesh communication network 120. Each time a node device generates a new message, said node device increments its counter and includes in the message in question the value of said counter. Thus, when a node device receives a message, said node device analyses the identifier of the node device originating the message and the sequence included in the message, and can determine whether the message received is actually a new message or a new copy of a message already received.

Each node device can however decide not to relay a route discovery request when one or more criteria are not met. In particular, before deciding to relay said request, the node device in question typically checks whether said request comprises information representing a route cost, from the source node device to the node device in question, which is better than the route cost represented by information contained in another route discovery request previously received by the node device in question. In other words, the node device in question relays, by broadcasting, said request if said request relates to a path that has followed, from the source node device to the node device in question, a pathway with a lower cost than any other request previously received by the node device in question (and therefore for the same route discovery).

The cost of a route may rely on one or more metrics. For example, the route cost is a number of hops undergone by the request in question from the source node device. According to another example, the route cost is the result of a calculation that depends on the bandwidth of the links crossed, by the request in question, from the source node device and/or on the quality of the communication links. According to yet another example, the route cost is proportional to the latency undergone by the request in question from the source node device. Other metrics can be used for establishing a route cost, i.e. a transit cost, from the source node device to the destination node device. According to yet another example, the route cost also depends on the medium, i.e. radio or PLC, used for transmitting the data between two successive nodes.

When a node device decides to relay, by broadcasting, a route discovery request, the node device in question updates the route cost information contained in said request, so as to take into account the fact that said request is passed by the node device in question. Thus, according to such a principle, a plurality of route discovery requests typically arrive at the destination node device, each comprising information on the cost of the route that said request followed to be propagated from the source node device to the destination node device. The pathway followed by said route discovery request associated with the best route cost is next selected to enable the source node device to transmit data to the destination node device. To activate the route in question, the destination node device transmits a route discovery reply, called RREP ("Route REPly"). This route discovery reply is transmitted gradually by following the path that is the reverse of the route discovery request that was associated with the best route cost. Each node device receiving the route discovery reply updates an internal routing table, at the data link layer DLL, in order to indicate therein that any subsequent message transmitted in unicast mode from the source node device in question to the destination node device in question must be transmitted or relayed to such and such a node device of its network neighbourhood. Within the link layer, the routing tables are preferentially implemented in an adaptation sublayer responsible for implementing the routing protocol in the communication network. For example, this adaptation sublayer is in accordance with the 6LoWPAN protocol (standing for "IPv6 over Low power Wireless Personal Area Networks"), which was initially developed for supporting IPv6 in the context of IEEE 802.15.4. It should be noted that the 6LoWPAN protocol itself relies on the routing protocol of the aforementioned LOADng reactive type. A hybrid abstraction layer provides suitable services to the adaptation sublayer with a view to sending/receiving data to/from the appropriate MAC ("Medium Access Control") sublayer, i.e. RF or PLC.

By means of the routing tables thus configured, unicast communications can be made by any pair of node devices in the mesh communication network 120. Intermediate node devices therefore serve as relays when the node devices in said pair are not in the network neighbourhood of each other, and the communications thus take place gradually, each node device relying on one of its own neighbours to convey messages to their respective destinations.

To communicate between neighbouring node devices, i.e. node devices that are in the network neighbourhood of each other), the messages are transmitted in the form of modulated frames. When a modulated frame is specifically addressed to a neighbouring node device and is correctly demodulated by it, said neighbouring node device retransmits an acknowledgement ACK to the node device that addressed said modulated frame to it on the frequency band or RF channel on which the modulated frame was sent.

Several frequency bands and at least one RF channel are defined to support the transmission of these modulated frames, an adapted modulation scheme being associated with each of these frequency bands and with the RF channel. Each frame transmitted in the form of modulated signals begins with a preamble defined according to the modulation scheme according to which said signals were modulated. The preamble is adapted to make it possible to synchronise in reception on said frame, i.e. to be able to determine an actual instant of start of frame. To do this, the preamble typically comprises a plurality of successive copies of one and the same symbol. The actual content and the duration of the preamble are thus predefined and dependent on the modulation scheme used. The preambles of several frames are identical when the same modulation scheme is applied, and different otherwise. In the remainder of the document, to alleviate the text, the term "frequency band" is used indifferently to designate a PLC frequency band or an RF channel.

The modulation schemes (and corresponding demodulation schemes) applicable are preferentially multicarrier modulation schemes (and respectively demodulation schemes) of the OFDM type ("Orthogonal Frequency Division Multiplex") in PLC or SUN-FSK (the English acronym for Smart Utility Network—Frequency Shift Keying) in RF.

In terms of frequency bands that can be used in the context of the implementation of the mesh communication network 120, mention can be made of: the CENELEC A frequency band, which ranges approximately from 35 kHz to 91 kHz; the FCC frequency band, which ranges approximately from 150 kHz to 480 kHz; the ARIB frequency band, which ranges approximately from 150 kHz to 400 kHz; and the CENELEC B frequency band, which ranges approximately from 98 kHz to 122 kHz and the RF radio cannel, which ranges approximately from 863 MHz to 870 MHz. It is then possible to use: a first thirty-six carrier modulation scheme in the CENELEC A frequency band; a second seventy-two carrier modulation scheme in the FCC frequency band; a third fifty-four carrier modulation scheme in the ARIB frequency band; a fourth sixteen carrier modulation scheme in the CENELEC B frequency band and a fifth modulation scheme of the SUN-FSK type for the RF radio channel of G3-PLC Hybrid PLC & RF. The SUN-FSK modulation is defined in section 20 of the document IEEE 802.15.4:2015.

Figure 2:
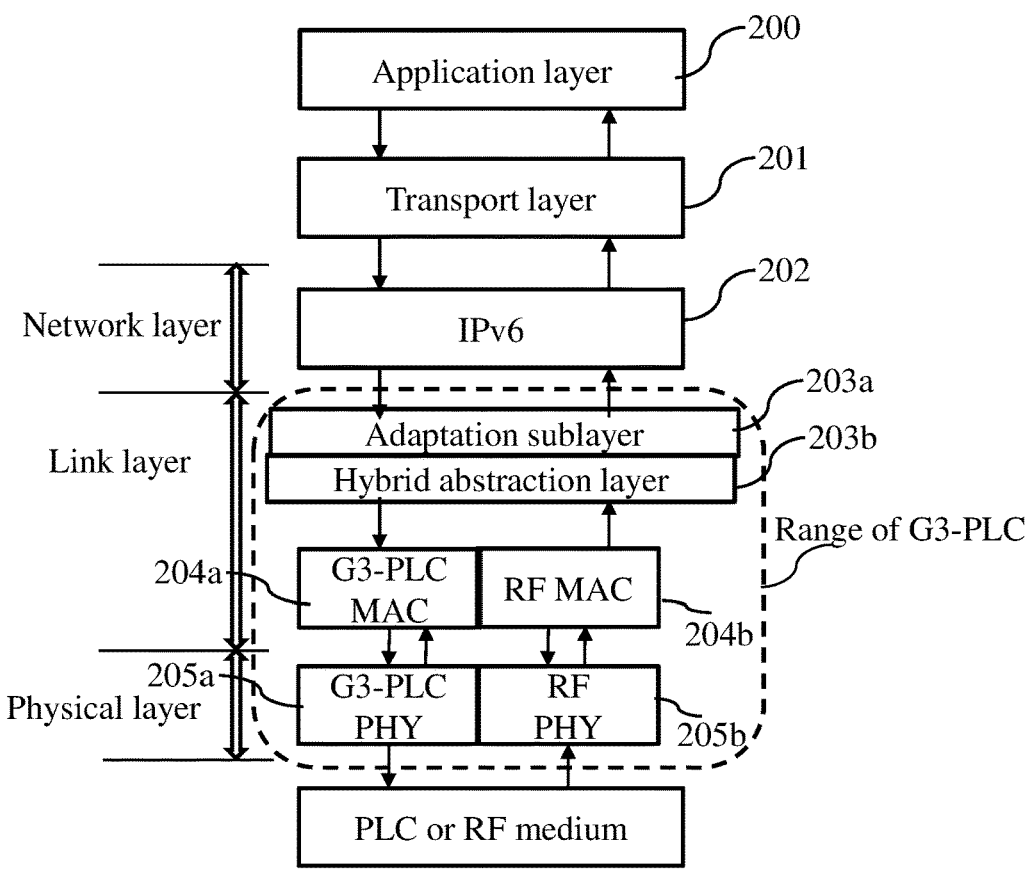
FIG. 2 illustrates schematically the various layers of an OSI model in the particular case of the G3-PLC Hybrid PLC & RF standard.

FIG. 2 illustrates schematically the various layers of an OSI model in the particular case of the G3-PLC Hybrid PLC & RF standard as defined in Annex H of the ITU-T recommendation G.9903 (2017) Amendment 1 (05/2021).

A message to be transmitted coming from an application layer 200 is transmitted to a transport layer 201. The transport layer 201 contains all the protocols responsible for managing errors and controlling the network flows. The two main protocols used are the TCP and UDP protocols. The transport layer 201 creates packets by adding headers to the data coming from the application layer 200. The packets are next transmitted to an IP 202 layer, e.g. IPv6. The IP 202 layer encapsulates the packets coming from the transport layer 201 by adding in particular an IP header, e.g. IPv6. An IPv6 packet can do up to 1400 bytes. In the case where the packet has a size above a threshold value, this packet is fragmented into at least two fragments in order to adapt it to the constraints of a MAC sublayer 204a or 204b, in particular to the size of the MAC frames.

For this purpose, the G3-PLC Hybrid PLC & RF standard incorporates the 6LoWPAN protocol, which makes it possible to adapt IPv6 data packets to the constraints of the MAC sublayers 204a or 204b, in particular by fragmenting them. This is because the MAC frames used are of much lower sizes (400 bytes maximum available per packet for the IP part) than the IPv6 packets of 1400 bytes.

An adaptation sublayer 203a incorporating the 6LoW-PAN protocol and located between the IP network layer 202 and the MAC sublayer 204a or 204b of the OSI model receives, from the IP network layer 202, IPv6 packets of 1280 bytes and where applicable fragments them. Naturally, in the case of an IP packet that is sufficiently small to be contained in a single MAC G3-PLC or MAC RF frame no fragmentation is performed.

A hybrid abstraction layer 203b next transfers the fragment or the IP packet in the case of absence of fragmentation to the appropriate MAC sublayer 204a or 204b according to the medium selected for transmission thereof. Hereinafter the term fragment is used for designating both a fragment obtained from a fragmented IP packet or the IP packet itself in the case of absence of fragmentation.

Transmitting a fragment on the PLC medium, i.e. on the powerline, conventionally comprises various steps, in particular a segmentation of the fragments in order to adapt them to a G3-PLC PHY physical layer 205a and an OFDM modulation of the signal. The segmentation consists in partitioning a MAC frame into PSDUs (the English acronym for "PHY Service Data Unit"). All the PSDUs coming from one and the same fragment are modulated using the same modulation scheme.

Transmitting a fragment by radio frequency over the RF channel comprises various steps, in particular a segmentation of the fragments in order to adapt them to an RF PHY physical layer 205b and a SUN-FSK modulation of the signal. As in the PLC case, the segmentation consists in partitioning a MAC frame into PSDUs (the English acronym for "PHY Service Data Unit"). All the PSDUs coming from one and the same fragment are modulated using the same modulation scheme. The specification of the RF PHY physical layer is given in sections 10, 11 and 20 of IEEE 802.15.4-2015 as amended by IEEE 802.15.4v:2017 and supplemented by Table H-5-1 of the ITU-T recommendation G.9903 (2017) Amendment 1 (05/2021).

It should be noted that the G3-PLC Hybrid PLC & RF standard imposes constraints on each node device with regard to the time of use, on a sliding time window, of transmission by radio frequency. These constraints are defined in Table H.6.8 of annex H. For this purpose, the following values are defined at each node device:

macDutyCyclePeriod_RF: a first predetermined value that defines a duration, e.g. in seconds, of the sliding time window (for example macDutyCyclePeriod_RF=3600 s), macDutyCycleLimit_RF: a second predetermined value that defines an absolute limit, e.g. in seconds, of authorised time of use of transmission by radio frequency on the sliding time window (for example macDutyCycleLimit_RF=90 s for the meters and macDutyCycleLimit_RF=360 s for the data concentrator), macDutyCycleThreshold_RF: a third predetermined value that defines a maximum threshold of time of use authorised for transmission by radio frequency beyond which any transmission by radio frequency is interrupted, e.g. expressed as percents (for example macDutyCycleThreshold_RF=90%, which means that the transmissions by radio frequency are stopped when 90% of 90 seconds out of the last 3600 seconds is reached for the meters, or 90% of 360 seconds out of the last 3600 seconds for the data concentrator), macDutyCycleUsage_RF: a level of use of the transmission by radio frequency. This level of use is calculated on the sliding window with respect to the second predetermined value, i.e. macDutyCycleLimit_RF. The ITU-T recommendation G.9903 (2017) Amendment 1 (05/2021) indicates in table H.6.8 that macDutyCycleUsage_RF=tps/macDutyCycleLimit_RF*100 where tps is the total current time of use of the transmission by radio frequency on the sliding time window by the node device.

Figure 3:
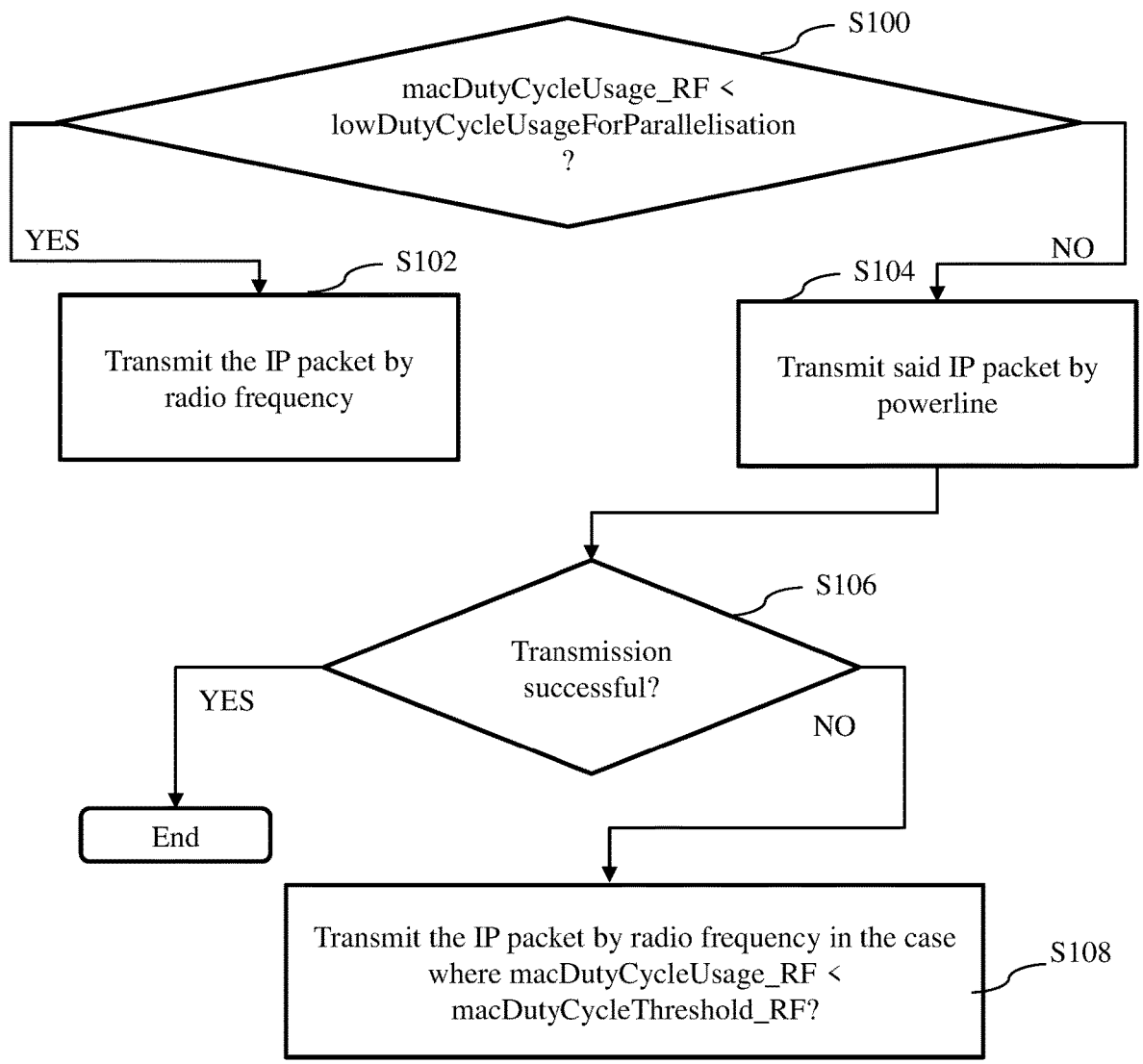
FIG. 3 illustrates schematically a method for transmitting a short IP packet according to a particular embodiment.
Figure 4:
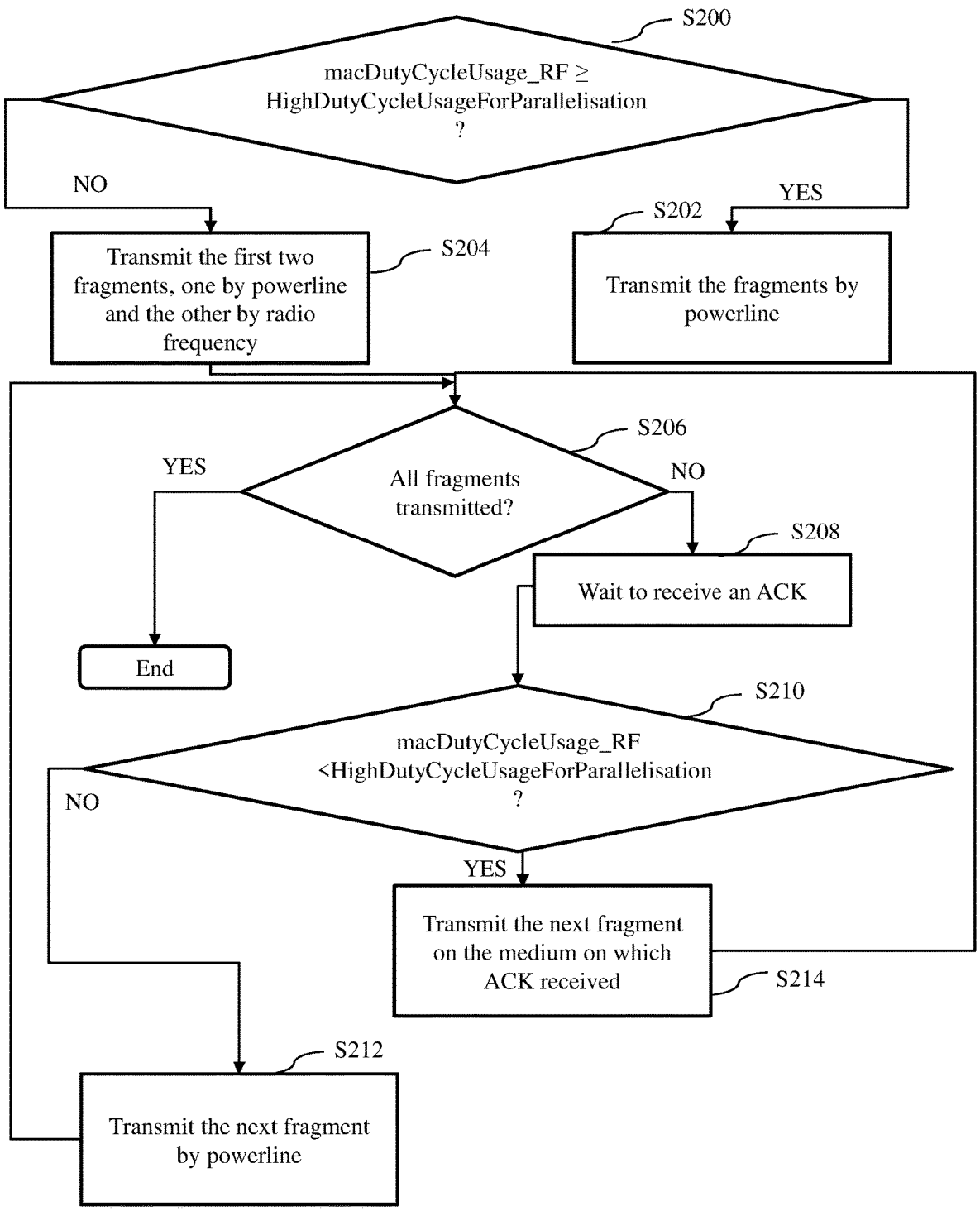
FIG. 4 illustrates schematically a method for transmitting a long IP packet according to a particular embodiment.

This level of use is for example updated after each transmission by radio frequency. In order to use all the flexibility offered by PLC/RF hybridisation while respecting the time constraints imposed on the use of transmission by radio frequency, the transmission methods described with reference to FIGS. 3 and 4 are implemented to distribute the fragments supplied by the adaptation sublayer 203a between the two RF MAC and PLC MAC layers in an optimum manner. More precisely, the methods described are implemented at the hybrid abstraction layer 203b.

FIG. 3 illustrates schematically a method for transmitting a short IP packet, i.e. one the size of which is below the threshold value, according to a particular embodiment. In this embodiment, the IP packet to be transmitted is not fragmented according to the 6LoWPAN protocol since it is small enough to be able to be contained in a single MAC frame.

In a step S100, macDutyCycleUsage_RF is compared with lowDutyCycleUsageForParallelisation. If macDutyCycleUsage_RF<lowDutyCycleUsageForParallelisation, then the method continues at the step S102, otherwise it continues at the step S104. lowDutyCycleUsageForParallelisation is a threshold below which it is considered that transmission by radio frequency has been very little used. This threshold is lower than macDutyCycleThreshold_RF. For example, lowDutyCycleUsageForParallelisation=0.5*macDutyCycleThreshold_RF.

In the step S102, the IP packet is transmitted by radio frequency, i.e. using the RF medium. In the step S104, the IP packet is transmitted by powerline, i.e. using the PLC medium.

In a step S106, the method determines whether transmission by powerline has succeeded. In this case, the transmission has succeeded if the node device that transmitted the IP packet has received an acknowledgement ACK on the PLC medium. The acknowledgement ACK was sent by the node device that received the IP packet. If the transmission of the IP packet by powerline has succeeded, then the method ends. Otherwise the method continues at the step S108. In the step S108, the IP packet is transmitted by radio frequency in the case where macDutyCycleUsage_RF<macDutyCycleThreshold_RF.

FIG. 4 illustrates schematically a method for transmitting a long IP packet, i.e. one where the size is above the threshold value, according to a particular embodiment. In this embodiment, the IP packet to be transmitted is fragmented in accordance with the 6LoWPAN protocol since it is too large to be able to be contained in a single MAC frame.

In a step S200, macDutyCycleUsage_RF is compared with HighDutyCycleUsageForParallelisation. If macDutyCycleUsage_RF≥HighDutyCycleUsageForParallelisation, then the method continues at the step S202, otherwise it continues at the step S204. HighDutyCycleUsageForParallelisation is a threshold beyond which it is considered that transmission by radio frequency has already been greatly used. This threshold is lower than macDutyCycleThreshold_RF and higher than LowDutyCycleUsageForParallelisation. For example, HighDutyCycleUsageForParallelisation=0.8*macDutyCycleThreshold_RF.

At the step S202, all the fragments of the long IP packet are transmitted by powerline, i.e. using the PLC medium.

At the step S204, the first two fragments are transmitted, one by powerline and the other by radio frequency. For example, the first fragment is transmitted by powerline and the second fragment is transmitted by radio frequency or vice versa.

In a step S206, the method determines whether all the fragments have been transmitted. If such is the case then the method ends. Otherwise, at the step S208, the node device that transmitted the fragment waits until it receives an acknowledgement ACK on one or other medium.

In a step S210, macDutyCycleUsage_RF is compared with HighDutyCycleUsageForParallelisation. If macDutyCycleUsage_RF<HighDutyCycleUsageForParallelisation, then the method continues at the step S214, otherwise it continues at the step S212.

At the step S214, the next fragment to be transmitted is transmitted using the same medium as the one on which the acknowledgement was received for the previous fragment. At the step S212, the next fragment is transmitted by powerline.

The steps S206 to S214 are repeated as long as there are still fragments to be transmitted.

The methods described in relation to FIGS. 3 and 4 can be used independently of each other or in combination. Thus it is possible for the node devices of the network to implement the method described in relation to FIG. 3 without implementing the one in relation to FIG. 4 and vice versa. In a variant, the node devices of the network implement the two methods described in relation to FIGS. 3 and 4.

By means of the methods described, the PLC and RF media can be used simultaneously for sending various fragments of one and the same IP packet or for sending successive IP packets. These methods are furthermore defined so that the time constraints for use of transmission by radio frequency established in the G3-PLC Hybrid PLC & RF standard are respected.

Figure 5:
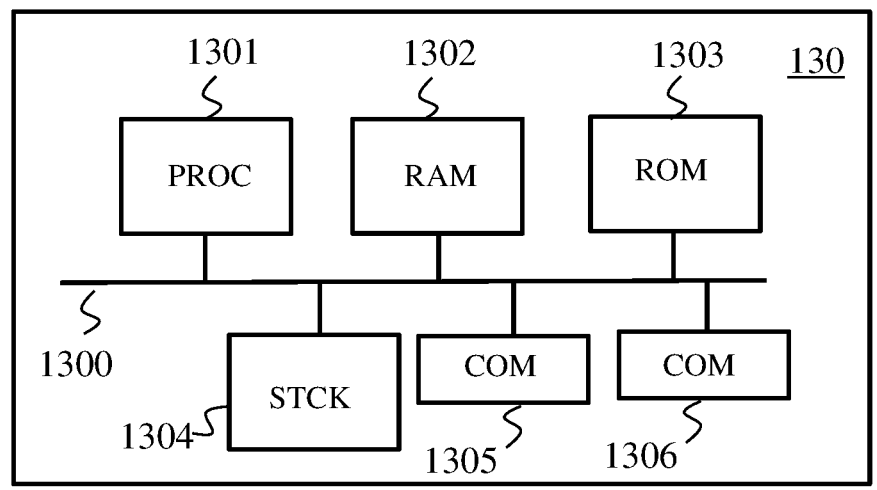
FIG. 5 illustrates schematically an example of hardware architecture of a node device of the mesh communication network according to a particular embodiment.

FIG. 5 illustrates schematically an example of hardware architecture of a node device 130 of the mesh communication network 120 according to one embodiment. Such a node device is for example a meter or a data concentrator.

According to the example of hardware architecture shown in FIG. 5, the node device 130 then comprises, connected by a communication bus 1300: a processor or CPU (central processing unit) 1301; a random access memory RAM 1302; a read only memory ROM 1303; a storage unit such as a hard disk (or a storage medium reader, such as an SD (Secure Digital) card reader 1304; at least one communication interface 1305 enabling the node device 130 to communicate with the node devices belonging to its neighbourhood, e.g. the nodes 131 and 133.

The processor 1301 is capable of executing instructions loaded in the RAM 1302 from the ROM 1303, from an external memory (not shown), from a storage medium (such as an SD card), or from a communication network. When the node device is powered up, the processor 1301 is capable of reading instructions from the RAM 1302 and executing them. These instructions form a computer program causing the implementation, by the processor 1301, of all or some of the methods described in relation to FIGS. 3 and 4.

The methods described below in relation to FIGS. 3 and 4 can be implemented in software form by executing a set of instructions by a programmable machine, for example a DSP (Digital Signal Processor) or a microcontroller, or be implemented in hardware form by a machine of a dedicated component, for example an FPGA (field-programmable gate array) or an ASIC (application-specific integrated circuit). In general, the node device 130 comprises electronic circuitry configured for implementing the methods described in relation to FIGS. 3 and 4.

The invention claimed is:

1. A transmission method for transmitting an Internet Protocol (IP) packet from a first node device to a second node device belonging to a network neighbourhood of the first node device, the first and second node devices belonging to an electrical supply network and being configured for transmitting the IP packet by powerline and by radio frequency, a use of the transmission by radio frequency being, at each node device, limited to a maximum use time (macDutyCycleLimit_RF) on a sliding time window, wherein the transmission method causes the first node device to perform, in the case where the IP packet is not fragmented:

transmitting the IP packet by radio frequency in the case where a level of use (macDutyCycleUsage_RF) by the first node device of the radio frequency transmission calculated on the sliding time window with respect to the maximum use time is below a first threshold (lowDutyCycleUsageForParallelisation), said first threshold being a threshold below which it is considered that transmission by radio frequency has been very little used, and said first threshold being below a second threshold (macDutyCycleThreshold_RF) beyond which any transmission by radio frequency is interrupted;

transmitting the IP packet by powerline otherwise, and, in the case where the powerline transmission fails, transmitting the IP packet by radio frequency in the case where the level of use (macDutyCycleUsage_RF) is below the second threshold (macDutyCycleThreshold_RF).

2. The transmission method according to claim 1, furthermore causing the first node device to perform, in the case where the IP packet is fragmented into a plurality of fragments comprising at least first and second fragments:

transmitting the fragments of the plurality of fragments by powerline in the case where the level of use (macDutyCycleUsage_RF) is above a third threshold, the third threshold being above the first threshold and below the second threshold; and otherwise transmitting the first fragment using a transmission medium from powerline and radio frequency and transmitting the second fragment using another one of the transmission medium;

in the case where fragments are still to be transmitted, repeating the following steps:

in the case where the level of use (macDutyCycleUsage_RF) is below the third threshold and an acknowledgement has been received on a communication medium, transmitting a next fragment of the plurality of fragments using the communication medium on which the acknowledgement was received;

transmitting the next fragment by powerline otherwise.

3. The method according to claim 1, wherein the level of use (macDutyCycleUsage_RF) is equal to tps/macDutyCycleLimit_RF*100, where macDutyCycleLimit_RF is the maximum use time on the sliding window and tps is the time of use by the node device of the transmission by radio frequency on the sliding time window.

4. The method according to claim 2, wherein the IP packet is fragmented by an adaptation sub-layer incorporating a IPV6 over Low power Wireless Personal Area Networks (6LoWPAN) protocol.

5. The method according to claim 1, wherein, in the case where the IP packet is transmitted by powerline, the IP packet is transmitted on at least one frequency band belonging to a set of frequency bands comprising:

a CENELEC A frequency band;

a CENELEC B frequency band; and a FCC frequency band or a ARIB frequency band.

6. The method according to claim 1, wherein, in the case where the IP packet is transmitted by radio frequency, the IP packet is transmitted on a frequency band ranging from 863 MHz to 870 MHz.

7. A node device belonging to an electrical supply network, the node device being configured for transmitting an internet protocol (IP) packet by powerline and by radio frequency to another node of the electrical supply network belonging to its network neighbourhood, a use of the transmission by radio frequency being, at each node device, limited to a maximum use time (macDutyCycleLimit_RF) on a sliding time window, wherein the node device comprises:

circuitry configured for causing the node device to perform, in the case where the IP packet is not fragmented:

transmitting the IP packet by radio frequency in the case where a level of use (macDutyCycleUsage_RF) by the first node device of the transmission by radio frequency calculated on the sliding time window with respect to the maximum use time is below a first threshold (lowDutyCycleUsageForParallelisation), said first threshold being a threshold below which it is considered that transmission by radio frequency has been very little used, and said first threshold being below a second threshold macDutyCycleThreshold_RF beyond which any transmission by radio frequency is interrupted;

transmitting the IP packet by powerline otherwise, and, in the case where the powerline transmission fails, transmitting the IP packet by radio frequency in the case where the level of use (macDutyCycleUsage_RF) is below the second threshold macDutyCycleThreshold_RF.

8. The node device according to claim 7, wherein the circuitry causing the node device furthermore to perform, in the case where the IP packet is fragmented into a plurality of fragments comprising at least first and second fragments:

transmitting the fragments of the plurality of fragments by powerline in the case where the level of use (macDutyCycleUsage_RF) is above a third threshold, the third threshold being above the first threshold and below the second threshold; and otherwise transmitting the first fragment using a communication medium from powerline and radio frequency and transmitting the second fragment using the other one of the communication media;

in the case where fragments are still to be transmitted, repeating the following steps:

in the case where the level of use (macDutyCycleUsage_RF) is below the third threshold and an acknowledgement has been received on a communication medium, transmitting a next fragment of the plurality of fragments using the communication medium on which the acknowledgement was received;

transmitting the next fragment by powerline otherwise.

9. A non-transitory storage medium storing a computer program comprising instructions for implementing, by a processor, the transmission method according to claim 1, when said program is executed by said processor.

* * * * *